US006710136B2

(12) United States Patent
Grenda et al.

(10) Patent No.: US 6,710,136 B2
(45) Date of Patent: Mar. 23, 2004

(54) MATT PU POWDER COATINGS

(75) Inventors: Werner Grenda, Herne (DE); Joern Volker Weiss, Haltern (DE)

(73) Assignee: Degussa AG, Duesseldforf (DE)

( * ) Notice: Subject to any disclaimer, the term of this patent is extended or adjusted under 35 U.S.C. 154(b) by 31 days.

(21) Appl. No.: 09/939,831

(22) Filed: Aug. 28, 2001

(65) Prior Publication Data
US 2002/0045717 A1 Apr. 18, 2002

(30) Foreign Application Priority Data
Aug. 29, 2000 (DE) .......................... 100 42 318

(51) Int. Cl.[7] ...................... C09D 167/02; C09D 175/06
(52) U.S. Cl. ................ 525/440; 525/452; 525/934
(58) Field of Search ................... 525/440, 934

(56) References Cited

U.S. PATENT DOCUMENTS 4,920,173 A * 4/1990 Gras

FOREIGN PATENT DOCUMENTS

| DE | 196 30 844 | * | 2/1998 |
| EP | 0 248 336 | * | 12/1987 |
| EP | 0 950 676 | * | 10/1999 |

* cited by examiner

*Primary Examiner*—Patricia A. Short
(74) *Attorney, Agent, or Firm*—Oblon, Spivak, McClelland, Maier & Neustadt, P.C.

(57) ABSTRACT

A matt polyurethane powder coating material comprises:
- A) 3 to 25% by weight of a polyurea;
- B) 35 to 75% by weight of at least one polyester synthesized from polyols and 15–100 mol. % of succinic acid or its anhydride, having an OH number of 20–250 mg KOH/g;
- C) 7 to 25% by weight of at least one curing agent of a blocked polyisocyanate, isocyanurate, uretdione or a combination thereof having a functionality of at least 2; and
- D) 1 to 50% by weight of auxiliaries and additives; wherein from 0.6 to 1.2 NCO groups are available per OH group of the resin.

16 Claims, No Drawings

MATT PU POWDER COATINGS

BACKGROUND OF THE INVENTION

1. Field of the Invention

The present invention relates to matt polyurethane powder coating materials which comprise polyureas, polyesters and crosslinkers.

2. Description of the Background

For a long time there has been increasing interest in powder coating materials which produce a matt surface. The reason for this is first and foremost practical. Glossy surfaces require a far higher degree of cleaning than do matt surfaces. In addition, it may be desirable for safety reasons to avoid strongly reflecting surfaces.

The most simple principle of obtaining a matt surface is to admix smaller or larger amounts of fillers, such as chalk, finely divided silica or barium sulfate, into the powder coating material in accordance with the extent of the desired matt effect. However, such additions bring about a deterioration in the film properties of the coating, such as adhesion, flexibility, impact strength, and chemical resistance.

The addition of substances which are incompatible with the coating material, such as waxes or cellulose derivatives, for example, does give rise, it is true, to matting, but slight changes in the course of extrusion lead to fluctuations in the surface gloss. The reproducibility of the matt effect is not ensured.

Polyisocyanates containing urea and uretdione groups have become known only in relatively recent times. DE 195 46 750 claims reaction products of isophorone diisocyanate uretdione and disecondary diamines as curing agents for producing polyurethane (PU) coatings with glossy surfaces.

DE 196 30 844 is the first document to describe matt PU powder coating materials which comprise, as their curing component, isophorone diisocyanate uretdiones containing urea groups. The powder coating materials are prepared by reacting uretdiones with water. Intermediates which form during this reaction, accompanied by the elimination of carbon dioxide, are primary amines, which react with remaining isocyanate groups to form ureas. The nitrogen atoms of the urea groups are each monosubstituted. Reactions of polyisocyanates with water are difficult to reproduce because of the formation of byproducts.

DE 196 37 375 describes PU powder coating materials which are formulated so as to exhibit a matting effect on a coated substrate by means of isophorone diisocyanate uretdiones containing urea groups as curing agents. These curing agents are formed by the reaction of isophorone diisocyanate uretdione with disecondary diamines. The disecondary diamines are reaction products of diprimary diamines and maleic or fumaric esters.

DE 196 37 377 and DE 198 16 547 disclose polyaddition products containing uretdione groups and urea groups as a curing component for the matting of PU powder coating materials. These curing agents are prepared by the reaction of isophorone diisocyanate uretdione with diamines having one primary and one secondary amino groups. Preparation of the pure diamines is in some cases complex and very costly.

SUMMARY OF THE INVENTION

Accordingly, one object of the present invention is to provide matt PU powder coating materials which are easy to prepare and with which the matt effect is infinitely adjustable, with no deterioration in the mechanical properties of the powder coatings.

Briefly, this object and other objects of the present invention as hereinafter will become more readily apparent can be attained by a PU powder coating material composition comprising:

A) 3–25% by weight of polyurea;
B) 35–75% by weight of at least one polyester synthesized from polyols and 15–100 mol. % of succinic acid or its anhydride, having an OH number of 20–250 mg in KOH/g;
C) 7–25% by weight of at least one curing agent based on blocked polyisocyanates, isocyanurates and/or uretdiones having a functionality of at least 2; and
D) 1–50% by weight of auxiliaries and additives; wherein from 0.6 to 1.2 NCO groups are available per OH group of the resin.

DETAILED DESCRIPTION OF THE PREFERRED EMBODIMENTS

It was surprising to find that by combining polyurea and a polyester based on succinic acid, it is possible to obtain matt PU powder coating materials having outstanding properties.

The PU powder coating materials of the invention contain 3–25% by weight of polyurea. Customarily, the polyureas formed from at least one at least difunctional amine and isocyanate have an $NCO/NH_2$ ratio ranging from 0.9 to 1.1:1.

Polyureas are known and are described, for example, in:
Houben-Weyl E 20/2 (1987) pages 1721–1751;
Houben-Weyl XIV/2 (1963) pages 165–171.

In the context of the invention it is possible to employ all brittle, high-melting polyureas, e.g., those formed from aliphatic, (cyclo)aliphatic, cycloaliphatic and aromatic diamines and/or polyamines ($C_5$–$C_8$) and from the corresponding, or else different, isocyanates including diisocyanates and their oligomers, e.g., isocyanurate. Particularly suitable diisocyanates and/or isocyanurates are those of isophorone diisocyanate (IPDI), hexamethylene diisocyanate (HDI), and 4,4'-dicyclohexylmethane diisocyanate (HMDI).

One preferred embodiment of the invention is the use of polyureas based on nonaromatic amines and isocyanates, such as isophorone diamine (IPD) and isophorone diisocyanate (IPDI) and/or HDI, it being possible to employ the diisocyanate alone, as an isocyanurate, and in mixtures of this kind. The polyureas used with preference are disclosed in EM 000104 (internal file reference).

In the case of the polyester B) it is significant to the invention that the polyester be synthesized from at least 15 up to a maximum of 100 mol. % succinic acid. Other acids may be present in the preparation of the polyester, which preferably include adipic acid, tetrahydrophthalic acid, isophthalic acid, terephthalic acid, trimellitic acid, pyromellitic acid, and the anhydrides of the acids.

In principle, all known polyols are suitable for reaction with the acid in the context of the invention for preparing the polyester B). Suitable polyols are described, for example, in DE 27 35 497 and DE 30 04 903. Preferred polyols include ethylene glycol, 1,4-butanediol, 1,6-hexanediol, cyclohexanediol, neopentyl glycol, and 1,4-bis(hydroxymethyl)cyclohexane.

In general, polyester B) has an OH number of 20–250 mg KOH/g and an average molecular weight of 3000–8000, preferably 4000–5000.

As curing agents C) on the basis of polyisocyanates it is possible in principle to use the known curing agents in the field of powder coating materials. Preferred curing agents include polyisocyanates containing blocking agents and also internally blocked polyisocyanates. They are described, for example, in DE 21 05 777, DE 25 42 191, DE 27 35 497, DE 30 39 824, DE 30 30 572, DE30 30 513, and DE37 39 549.

Accordingly, the powder coating materials of the invention may comprise curing agents C) which include blocked polyisocyanates, blocked isocyanurates and uretdiones, alone or in mixtures. Preferably, the starting components are selected from IPDI, HDI, and HMDI.

Known blocking agents may be used. Preferred blocking agents include caprolactam, triazoles, oximes, and pyrazoles.

The auxiliaries and additives D) present in the PU powder coating materials of the invention are, for example, leveling agents, pigments, fillers, and catalysts. These materials are normally present in amounts of 1–50% by weight.

To prepare the ready-to-use powder coating materials, the OH-functionalized polyester, the isocyanate-based curing agent, the polyurea, leveling agents, pigments, and fillers are mixed with one another at room temperature and then homogenized at temperatures of 100–140° C. in an extruder or kneading apparatus. The ratio of resin to curing agent is selected such that there are from 0.6 to 1.2, preferably 0.8–1.0, NCO groups available per OH group of the resin.

After cooling, the extrudate is fractionated, ground, and subsequently sieved to a particle size<100 μm. The powder prepared in this way is applied to degreased iron panels using an electrostatic powder spraying unit at 60 kV and is baked in a forced-air oven at a temperature ranging from 160 to 210° C.

Having now generally described this invention, a further understanding can be obtained by reference to certain specific Examples which are provided herein for purposes of illustration only and are not intended to be limiting unless otherwise specified.

EXAMPLES

For the PU powder coating materials of the invention, OH-containing polyesters are used which contain at least 15 mol. % of succinic acid as acid component. The preparation of the powder coating materials is prepared by the known method of condensing polyols and polycarboxylic acids, as described, for example, in DE 25 35 497 and DE 30 04 903.

| Reactants | Polyesters | | |
|---|---|---|---|
| | PE 1 | PE 2 | PE 3 |
| Terephthalic acid | 75.0 mol. % | — | 70.0 |
| Adipic acid | 4.0 mol. % | — | — |
| Succinic acid | 21.0 mol. % | 100 | 30.0 |
| 1,4-butanediol | — | 100 | — |
| 1,4-ethylene glycol | 10.0 mol. % | — | 30.0 |
| Neopentyl glycol | 88.0 mol. % | — | 68.0 |
| Trimethylolpropane | 2.0 mol. % | — | 2.0 |
| OH number | 33 mg KOH/g | 31.0 | 36.0 |
| AN number | 3.0 mg KOH/g | 2.0 | 3.0 |

The polyureas (PH) as component A employed in the Examples are shown in the Table below in the amounts shown given in % by weight.

| Reactants | PH 1 | PH 2 | PH 3 |
|---|---|---|---|
| IPD | 36 | 28 | 34 |
| IPDI | 31 | — | — |
| IPDI isocyanurate | 32 | 72 | — |
| HDI isocyanurate | — | — | 66 |

All products are white, brittle substances, insoluble in the usual solvents, which melt with decomposition only above 250° C.

Powder coating materials were prepared as indicated in the description above from the abovementioned reactants, and tested. The associated technical data and results are shown in the following Table.

TABLE 1

MATT PU POWDER COATING FORMULATIONS

| | EXAMPLE | | | | | | |
|---|---|---|---|---|---|---|---|
| | 1 | 2 | 3 | 4 | 5 | 6 | 7 |
| VESTAGON B 1360 (Degussa-Hüls AG) | 10.5 | — | — | 12.4 | 11.6 | 10.5 | 11.3 |
| VESTAGON BF 1320 (Degussa-Hüls AG) | — | 9.2 | 11.0 | — | — | — | — |
| PE I | — | — | — | — | 51.9 | — | — |
| PE II | 53.0 | 54.2 | — | — | — | 53.0 | 57.2 |
| PE III | — | — | 52.5 | 51.1 | — | — | — |
| Leveling agent | 1.0 | 1.0 | 1.0 | 1.0 | 1.0 | 1.0 | 1.0 |
| Benzoin | 0.5 | 0.5 | 0.5 | 0.5 | 0.5 | 0.5 | 0.5 |
| PH 1 | — | — | 10.0 | — | 10.0 | 15.0 | — |
| PH 2 | 10.0 | 10.0 | — | 10.0 | — | — | — |
| PH 3 | — | — | — | — | — | — | 5.0 |
| TiO$_2$ | 25.0 | 25.0 | 25.0 | 25.0 | 25.0 | 20.0 | 25.0 |

TABLE 2

GLOSS AND MECHANICAL VALUES OF THE EXAMPLES

| | EXAMPLE | | | | | | |
|---|---|---|---|---|---|---|---|
| | 1 | 2 | 3 | 4 | 5 | 6 | 7 |
| Gloss 60°[1] | 12 | 14 | 45 | 47 | 44 | 12 | 16 |
| Gloss 85° | 30 | — | 73 | 75 | 67 | 35 | 35 |
| Cupping[2] | >10 | 4 | 10 | >10 | >10 | 8.5 | >10 |
| BI dir.[3] | >80 | >80 | 30 | 40 | 50 | 60 | >80 |
| BI rev. | >80 | 40 | >10 | >10 | >10 | 10 | >80 |

[1])Degree of gloss in accordance with Gardner
[2])Erichsen cupping, in mm
[3])BI: ball impact in · lb The disclosure of German priority Application Number 10042318.3 filed Aug. 29, 2000 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A matt polyurethane powder coating material, comprising:

A) 3 to 25% by weight of a polyurea formed from at least one difunctional amine and isocyanate reactant in amounts such that the NCO/NH$_2$ ratio ranges from 0.9 to 1.1:1;

B) 35 to 75% by weight of at least one polyester synthesized from polyols and 15–100 mol. % of succinic acid or its anhydride, having an OH number of 20–250 mg KOH/g;

C) 7 to 25% by weight of at least one curing agent of a blocked polyisocyanate, isocyanurate, uretdione or a combination thereof having a functionality of at least 2; and D) 1 to 50% by weight of auxiliaries and additives; wherein from 0.6 to 1.2 NCO groups are available per OH group of the resin.

2. The matt polyurethane powder coating material as claimed in claim 1, wherein the polyurea A) comprises the reaction product of:

at least one at least difunctional isocyanate and at least one at least difunctional amine.

3. The matt polyurethane powder coating material as claimed in claim 1, wherein the polyurea comprises an isocyanate and/or isocyanurate.

4. The matt polyurethane powder coating material as claimed in claim 3, wherein the isocyanate or isocyanurate is selected from the group consisting of IPDI, HDI and/or HMDI.

5. The matt polyurethane powder coating material as claimed in claim 1, wherein the polyurea comprises aliphatic, cycloaliphatic, aromatic diamines and/or polyamines having 5–18 carbon atoms.

6. The matt polyurethane powder coating material as claimed in claim 5, wherein said cycloaliphatic diamine is IPD.

7. The matt polyurethane powder coating material as claimed in claim 1, wherein the polyester B) is synthesized from at least one polyol selected from the group consisting of ethylene glycol, 1,4-butanediol, 1,6-hexanediol, cyclohexanediol, neopentyl glycol, 1,4-bis(hydroxymethyl)cyclohexane.

8. The matt polyurethane powder coating material as claimed in claim 1, wherein the polyester B) is synthesized from one the following acids in addition to succinic acid: adipic acid, tetrahydrophthalic acid, isophthalic acid, terephthalic acid, trimellitic acid and pyromellitic acid.

9. The malt polyurethane powder coating material as claimed in claim 1, wherein the polyester B) has a molecular weight of 3,000 to 8,000.

10. The malt polyurethane powder coating material as claimed in claim 9, wherein the polyester B) has a molecular weight of 4,000 to 5,000.

11. The malt polyurethane powder coating material as claimed in claim 1, wherein curing agent C) is a blocked polyisocyanate, a blocked isocyanurate and/or a uretdione of the diisocyanates IPDI, HDI and/or HMDI.

12. The malt polyurethane powder coating material as claimed in claim 11, wherein the curing agent C) is blocked with a blocking agent selected from the group consisting of caprolactam, triazoles, oximes, and pyrazoles.

13. The malt polyurethane powder coating material as claimed in claim 1, wherein the ratio of OH group-containing polyester to curing agent is such that from 0.6 to 1.2 NCO groups are available per OH group of the polyester.

14. The malt polyurethane powder coating material as claimed in claim 13, wherein from 0.8 to 1.0 NCO groups are available per OH group of the polyester.

15. The matt polyurethane powder coating material as claimed in claim 1, wherein said auxiliaries are leveling agents, pigments, fillers and catalysts.

16. A matt polyurethane powder coating material, comprising:

A) 3 to 25% by weight of a polyurea formed by the reaction of at least one aliphatic, cycloaliphatic or aromatic diamine and/or polyamine with isophorone diisocyanate, hexamethylene diisocyanate or 4,4'-dicyclohexylmethane diisocyanate or isocyanurates of the diisocyanates in amounts such that the NCO/NH$_2$ ratio ranges from 0.9 to 1.1:1;

B) 35 to 75% by weight of at least one polyester synthesized from polyols and 15–100 mol. % of succinic acid or its anhydride, having an OH number of 20–250 mg KOH/g;

C) 7 to 25% by weight of at least one curing agent of a blocked polyisocyanate, isocyanurate, uretdione or a combination thereof having a functionality of at least 2; and D) 1 to 50% by weight of auxiliaries and additives; wherein from 0.6 to 1.2 NCO groups are available per OH group of the resin.

* * * * *

UNITED STATES PATENT AND TRADEMARK OFFICE
CERTIFICATE OF CORRECTION

PATENT NO. : 6,710,136 B2
DATED : March 23, 2004
INVENTOR(S) : Grenda et al.

It is certified that error appears in the above-identified patent and that said Letters Patent is hereby corrected as shown below:

<u>Title page,</u>
Item [73], Assignee, should read:

-- [73] Assignee: Degussa AG, Duesseldorf (DE) --

Signed and Sealed this

Twenty-ninth Day of June, 2004

JON W. DUDAS
*Acting Director of the United States Patent and Trademark Office*